2,719,703

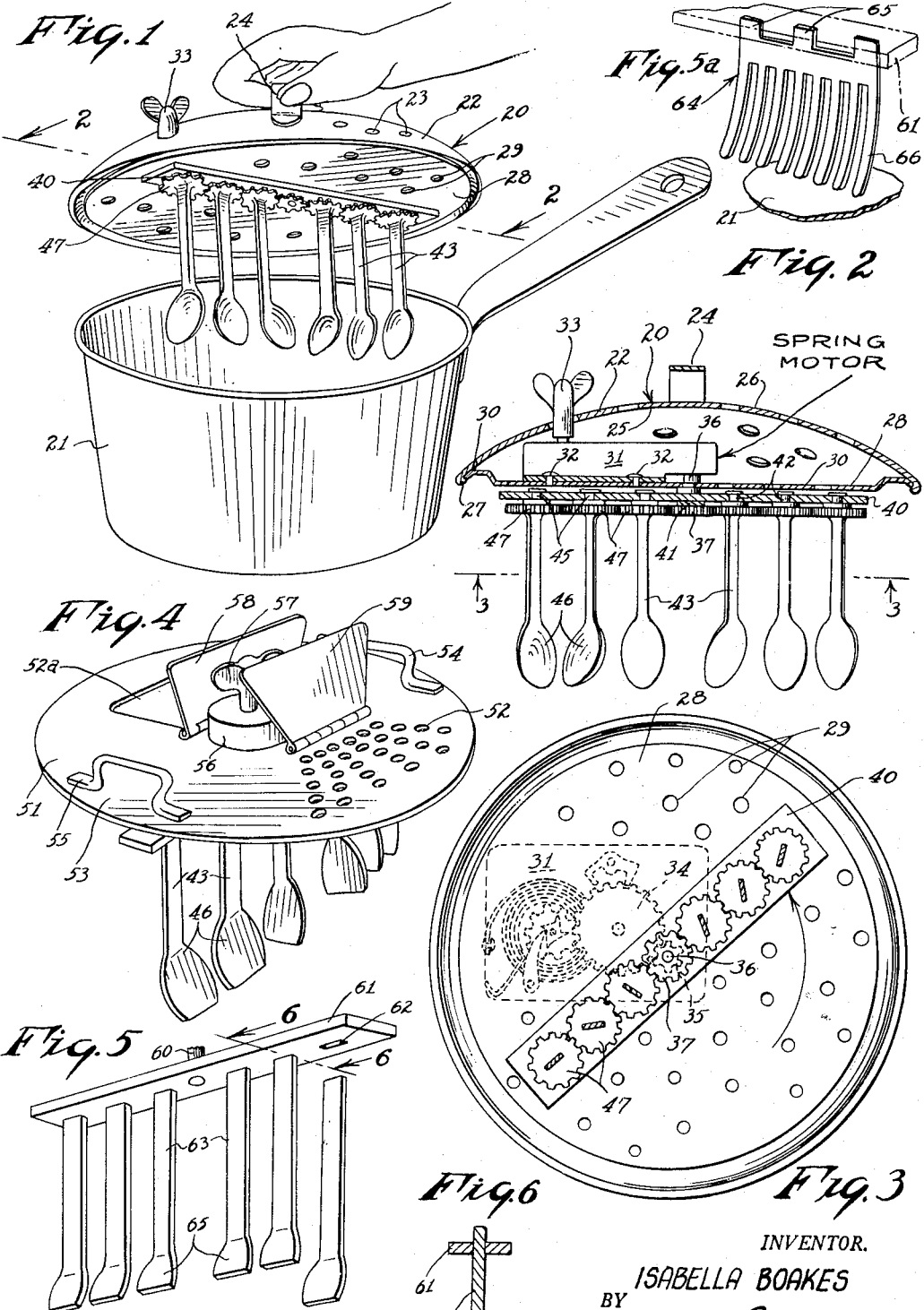

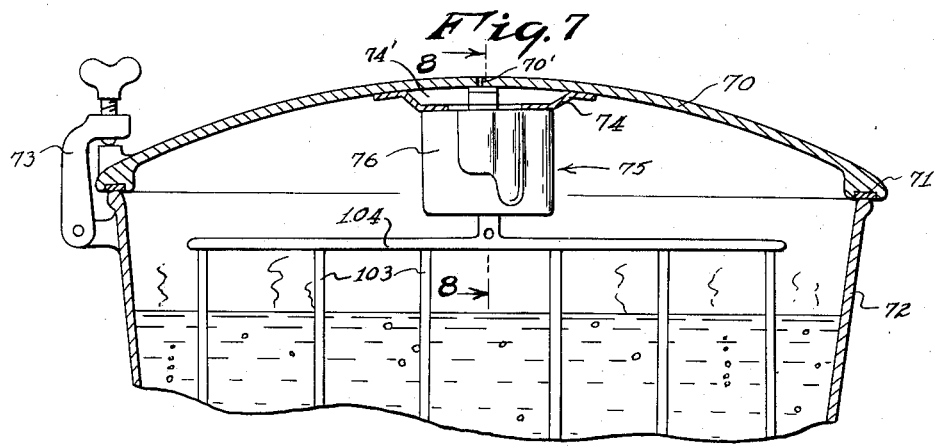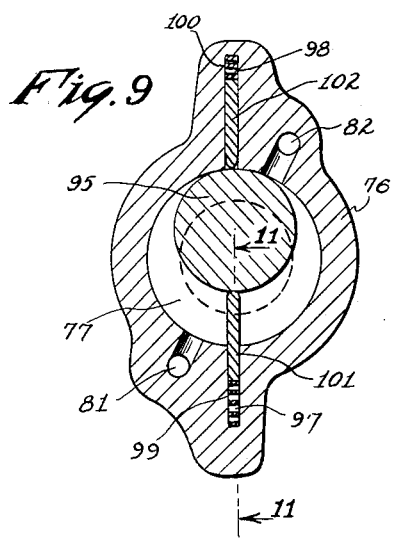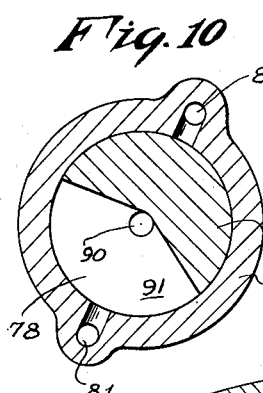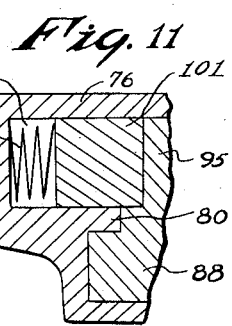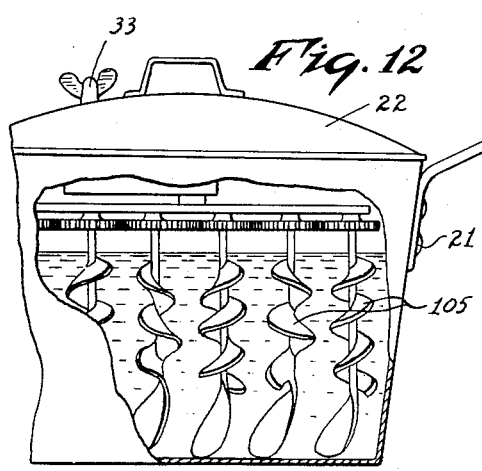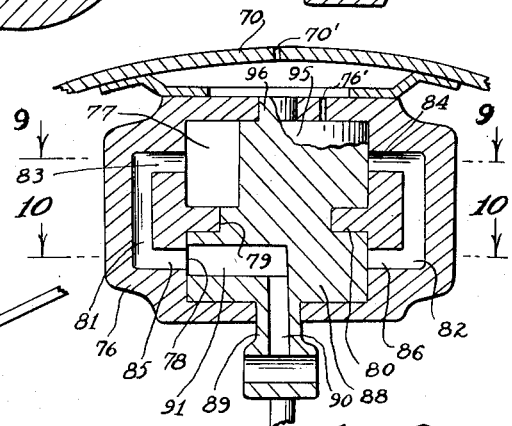
INVENTOR.
ISABELLA BOAKES
BY
L. S. Saulsbury
ATTORNEY

United States Patent Office 2,719,703
Patented Oct. 4, 1955

AUTOMATIC COOKING AND STIRRING DEVICE

Isabella Boakes, Woodbury, N. J.

Application December 24, 1952, Serial No. 327,849

3 Claims. (Cl. 259—118)

This invention relates to a cooking device, and more particularly to a device for automatically agitating food while being cooked.

It is well known that many foods require continuous agitation or stirring during the cooking process. While this operation is necessary to properly blend food, eliminate lumps, and to avoid burning, it is extremely laborious and time consuming, and hampers the coordination and timing necessary in the preparation of a complete meal.

Accordingly, it is a principal object of the present invention to provide a device which will eliminate manual stirring or agitating of food during the cooking thereof and which will thereby save time and labor.

It is still another object of the present invention to provide an improved cooking device which will better blend food and which will eliminate the lumps therefrom.

It is a further object of the present invention to provide a device which will eliminate burning of food during cooking operations.

It is still a further object of the present invention to provide an automatic stirring device adaptable for attachment to a pot which will cover or sweep a relatively large area of the bottom of the pot.

It is yet another object of the present invention to provide an automatic stirring device adaptable for attachment to cooking pots, in which the period of stirring may be selectively predetermined.

It is still a further object of the present invention to provide an automatic agitating device adaptable for attachment to cooking pots on which the agitators are selectively interchangeable.

It is a further object of the present invention to provide a device of the type described which is simple in construction and durable, which is effective for its intended purposes, and which can be manufactured and sold at a reasonable cost.

For other objects and for a better understanding of the invention, reference may be had to the following detailed description taken in connection with the accompanying drawing, in which:

Figure 1 is a perspective view showing the device constructed in accordance with the present invention, the device being attached to a cooking vessel or pot;

Fig. 2 is a vertical sectional view taken on the line 2—2 of Fig. 1;

Fig. 3 is a horizontal sectional view taken on the line 3—3 of Fig. 2;

Fig. 4 is a perspective view of a modified form of the invention;

Fig. 5 is a bottom perspective view of the agitating means shown in the form of Fig. 4;

Fig. 5a is a perspective view of a different shape of agitating blade adapted to fit the arm shown in Fig. 5;

Fig. 6 is a detailed fragmentary sectional view taken on the line 6—6 of Fig. 5;

Fig. 7 is a fragmentary vertical sectional view of another modified form of the present invention;

Fig. 8 is an enlarged vertical sectional view taken on the line 8—8 of Fig. 7;

Fig. 9 is a horizontal sectional view taken on the line 9—9 of Fig. 8;

Fig. 10 is a horizontal sectional view taken on the line 10—10 of Fig. 8;

Fig. 11 is a fragmentary vertical sectional view taken on the line 11—11 of Fig. 9;

Fig. 12 is an elevational view partially broken away of another modified form of agitating means.

Referring now more particularly to the form of the invention shown in Figs. 1, 2 and 3, 20 designates generally the agitating device adapted to fit a conventional cooking pot or vessel 21.

The agitating device 20 includes a lid or cover 22 having a plurality of spaced perforations 23 and a handle 24. The lid 22 is generally of circular configuration having a concave inner surface 25 and a convex outer surface 26 and a flange 27 extending around the periphery of the lid on the concave surface 25. Mounted on the underside of the lid 22, is a plate 28 having a plurality of spaced apertures 29. The plate 28 has its peripheral edge 30 abutting the peripheral flange 27, whereby the plate is retained within the lid 22. Mounted on the inner surface 30 of the plate 28 is a spring motor 31 of any conventional design. This spring motor is secured to the plate by rivets 32 and is provided with a winding knob 33 which extends outwardly through the lid 22. The spring motor actuates a drive gear 34 which is in meshing engagement with the pinion gear 35, Fig. 3. The latter gear is mounted on the upper end of a short pin or shaft 36 which is rotatively mounted in the plate 28. On the lower end of the pin or shaft 36 is a gear 37. The gears 35 and 37 are both fixed to the shaft 36.

Below the plate 28 is a bar 40, which is rotatably mounted intermediate its ends on the shaft or pin 36. The bar 40 is spaced above the gear 37 by a spacer 41. Arranged along the bar 40 are a plurality of spaced apertures 42 in which depending agitators or stirrers 43 are respectively mounted. The agitators are formed with journal bearing surfaces 45 on their upper ends and with paddle or spoon portions 46 on their lower ends. On each of the agitators 43 adjacent to and spaced inwardly from its upper end is integrally formed or fixedly secured thereto a toothed member or gear 47. Each of the gears 47 is meshingly interengaged with the next adjacent gear and those adjacent the gear 37 are meshingly interengaged therewith.

In operation, the agitating device is placed upon a cooking utensil or pot 21 as shown in Fig. 1. The spoon portions 46 of the agitators 43 will then be suspended into the food being cooked, and the spring motor 31 will be wound by rotative movement of the knob 33. As the spring motor unwinds, the shaft 36 will be rotated on a vertical axis and the gear 37 will drive the adjacent gears 47 to rotate the agitators 43. As rotation of the agitators will be partially resisted by the food being cooked, the bar 40 will also rotate to release a portion of the energy of the spring motor. The apertures 23 and 29 will allow the escape of steam from the cooking utensil, and, of course, the spring may be wound to any desired extent to selectively determine the period of agitation.

In Figs. 4, 5 and 6, there is shown a modified form of the invention, wherein a lid 51 is a flat plate having a plurality of spaced apertures 52 on one side thereof. On the upper surface 53 of the lid 51 are a pair of spaced handles 54 and 55 for placing the lid upon and removing it from the cooking vessel. Centrally of the lid 51 on the upper surface 53 is a spring motor 56 having a winged winding knob 57. At the opposite sides of the spring motor 56 are mounted a pair of closure flaps or plates 58 and 59, which are hingedly connected to the lid 51 and are mounted for swinging movement from a position upon the lid overlying the aperture to a position transversely of the lid. Thus, plates 58 and 59 may be arranged to close apertures 52 if desired. Instead of the aperture 52, a wide open space 52a may be provided for such foods that normally require no lid. Adjacent the underside of the lid 51 and operatively connected to the spring motor 56 by shaft 60 is a horizontally disposed bar 61, as shown in Fig. 5. The bar 61 is provided with a plurality of spaced slots 62 for removably receiving the upper end of the rigid agitators 63. As shown in Fig. 6, the upper end of each agitator 63 is slidably and removably received in the slot 62, the lower end being adapted for sliding engagement with the cooking pot. Of course, the agitators 63 could be fixedly secured in the bar 61. However, it has been found desirable to selectively employ agitators of various lengths and shape or design, the preferred length being determined by the depth of the pot with which the device is being used. The number of agitators may vary according to the thickness or viscosity of the food to be stirred.

In Figs. 7–11, inclusive, there are shown another modification of the present invention, wherein the use of external energy is not required. That is the steam or fluid pressure generated by the food being cooked is utilized to effect movement of the agitators. A lid 70 is provided with a sealing gasket 71 and is secured to the pot 72 by the clamp 73, whereby the lid and pot form a sealed chamber. Secured to the underside of lid 70 by an attaching bracket 74 is a fluid motor 75. The motor 75 includes a body 76 having an upper chamber 77 of cylindrical form, and a lower cylindrical chamber 78 spaced from the upper cylindrical chamber 77. In Fig. 5a, there is shown a wide agitator 64 having three attaching portions 65 adapted to fit in a set of slots 62 of the rotatable bar 61. This agitator 61 has a plurality of resilient depending fingers 66 which will engage and sweep the bottom of the vessel. Connecting the upper and lower chambers to provide a passage 79 is a circular shoulder 80. Also formed in the body 76, outwardly of the chambers 77 and 78, are a pair of oppositely-disposed ducts 81 and 82 which have their upper ends 83 and 84, respectively, in communication with the upper chamber 77, and their lower ends 85 and 86, respectively in communication with the lower chamber 78. Rotatably mounted in the lower chamber 78 is a rotor body 88 which has a stem 89 extending downwardly through the lower end of the body 76. Extending inwardly through the stem 89 is a port 90 which communicates with the interior of pot 72 and which opens into a segmental cutout portion 91 formed in the rotor body 88. The cutout portion 91 is adapted, upon rotative movement of the rotor body 88 for alternate communication with the lower ends of the ducts 81 and 82. Eccentrically mounted in the upper chamber 77 is a cylindrical body 95 which has its lower end formed integrally with or fixedly secured to the rotor member 88. The upper end 96 of the body 95 extends through the body 76 to form a bearing surface for rotative movement of the cylindrical body 95. The body 76 is formed with a pair of opposed slots 97 and 98 which communicate with the upper chamber 77. The slots are angularly spaced approximately 20 degrees from the ports 81 and 82 and are respectively provided with springs 99 and 100 for respectively resiliently urging the plates 101 and 102 projecting into the chamber 77, to bear against opposite sides of the upper cylindrical body 95 to partition the chamber 77. The attaching bracket 74 is dished and provides a small exhaust chamber 74'. Steam will exhaust through holes 76' into chamber 74' and to the atmosphere through a vent hole 70'.

In operation, the steam will enter through port 90 and into port 81 whereupon it is transmitted to the upper chamber 77 on one side of the cylindrical body 95. This causes the cylindrical body 95 to rotate about the vertical axis of the body 88. Upon rotation of the body 88 the fluid pressure will be communicated to the other port or duct 82 which in turn will enter the other side of the upper chambers 77 to continue rotation of the cylindrical body 95 about the axis of the body 88. Thus, the body 88 will continue to rotate as long as there is ambient fluid pressure.

As the stem 89 supports the agitators 103 by means of the cross bar 104, it is seen that the steam generated by the cooking food will serve to effect rotative movement of the agitators.

In Fig. 12, there is shown a device of the same general construction as that of Fig. 1. However, under certain circumstances it has been found preferable, as with thick food, to employ agitators having spirally extending surfaces as shown at 105 so as to elevate the bottom portions to the top of the food mass.

In view of the foregoing, it is seen that an automatic agitator is provided which will effect saving of time and labor, which will better blend food and avoid lumping and burning thereof, and which covers a relatively large area of the bottom of the cooking utensil. It is further seen that an automatic agitator is provided wherein the period of agitation may be predetermined, and which is adaptable to cooking vessels or pots of various sizes. It is also apparent that a stirring device has been provided which may utilize the fluid pressure generated by the cooking food, thereby eliminating the need for any external energy. It will also be apparent that the device can be operated by an electric motor with suitable gear reduction means interposed between the motor and the driving arm.

While various changes may be made in the detail construction, is shall be understood that such changes shall be within the spirit and scope of the present invention as defined by the appended claims.

What I claim is:

1. A stirring device for attachment to a cooking vessel comprising a lid having a concave inner surface, an inwardly directed flange extending around the periphery of said lid, a plate supported by said flange within said lid, a spring motor mounted on said plate, winding means for said spring motor extending through said lid, a shaft rotatably mounted in said plate, gear means for driving said shaft by said spring motor, a bar rotatably mounted on said shaft below said plate, a plurality of spaced journal means disposed along said bar, an agitator member rotatably mounted in each of said journal means, and intermeshing gear means fixed to each of said agitators and to said shaft.

2. A stirring device for attachment to a cooking vessel comprising a lid for the vessel, a plate disposed below said lid, a shaft rotatably mounted in said plate, a bar rotatably mounted on said shaft below said plate, means for driving said shaft, a plurality of spaced journal means disposed along said bar, an agitator rotatably mounted in each of said journal members, and intermeshing gear means fixed to each of said agitators and to said shaft.

3. A stirring device for a cooking vessel comprising a lid for the vessel, a drive shaft depending from said lid, means for driving said shaft, a horizontally disposed bar rotatably mounted on said shaft, a plurality of agitators rotatably mounted in said bar and intermeshing gear means fixed to each of said agitators and to said shaft.

References Cited in the file of this patent

UNITED STATES PATENTS

| Number | Name | Date |
|---|---|---|
| 39,532 | Taylor | Aug. 11, 1863 |
| 795,082 | Warner | July 18, 1905 |
| 1,454,223 | Poor | May 8, 1923 |
| 1,612,281 | Goetz | Dec. 28, 1926 |
| 1,774,509 | Gould | Sept. 2, 1930 |
| 1,831,499 | Losee | Nov. 10, 1931 |
| 2,265,533 | Lawrence | Dec. 9, 1941 |
| 2,449,578 | Barr | Sept. 21, 1948 |
| 2,505,967 | Humphrey | May 2, 1950 |